US006813286B1

(12) United States Patent
Danziger et al.

(10) Patent No.: US 6,813,286 B1
(45) Date of Patent: Nov. 2, 2004

(54) OPTICAL RESONATORS WITH DISCONTINUOUS PHASE ELEMENTS

(75) Inventors: Yochay Danziger, Rishon LeZion (IL); Asher A. Friesem, Rehovot (IL); Ram Oron, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 0 days.

(21) Appl. No.: 09/403,472

(22) PCT Filed: Apr. 29, 1998

(86) PCT No.: PCT/IL98/00204

§ 371 (c)(1),
(2), (4) Date: Jan. 5, 2001

(87) PCT Pub. No.: WO98/50986

PCT Pub. Date: Nov. 12, 1998

(30) Foreign Application Priority Data

May 1, 1997 (IL) ................................................ 120754

(51) Int. Cl.[7] ............................ H01S 3/10; H01S 3/098; H01S 3/13; H01S 3/08
(52) U.S. Cl. ............................... 372/19; 372/9; 372/18; 372/28; 372/29.023; 372/92; 372/98; 372/99
(58) Field of Search .............................. 372/9, 18, 19, 372/28, 29.023, 99, 98, 92, 32

(56) References Cited

U.S. PATENT DOCUMENTS

| | | | |
|---|---|---|---|
| 3,605,039 A | * | 9/1971 | Harris et al. ................... 372/23 |
| 4,637,027 A | | 1/1987 | Shirasaki et al. |
| 4,682,340 A | | 7/1987 | Dave et al. |
| 4,720,633 A | | 1/1988 | Nelson |
| 4,880,976 A | | 11/1989 | Mancuso et al. |
| 5,091,912 A | | 2/1992 | Bretenaker et al. |
| 5,230,004 A | | 7/1993 | Nicholson |

(List continued on next page.)

FOREIGN PATENT DOCUMENTS

| | | |
|---|---|---|
| WO | WO 97 34344 A | 9/1997 |
| WO | WO 97/34344 | 9/1997 |

OTHER PUBLICATIONS

Lee W. Casperson, Laser Focus World, May 1994, How phase plates transform and control laser beams, pp. 223, 224,226–228.*

Kol'chenko, A.P. et al., "Control of the structure of Transverse Laser Modes by Phase–Shifting Masks", *Soviet Journal of Quantum Electronics* (US), vol. 10, No. 8, Aug. 1980, pp. 1013–1016, XP002074489.

(List continued on next page.)

*Primary Examiner*—Don Wong
*Assistant Examiner*—Armando Rodriguez
(74) *Attorney, Agent, or Firm*—Christie, Parker & Hale, LLP

(57) ABSTRACT

A discontinuous phase element (86, 204) is disposed between the reflector (20, 23) elements of an optical resonator in order to suppress unwanted modes propagating within the cavity, and to preferentially allow the existence of preferred modes within the cavity. The discontinuous phase element (204) operates by producing sharp changes in the phase distribution of the undesirable modes, so that their propagation losses are sufficiently high prevent their build-up. This is achieved by introducing a discontinuous phase change to these modes at locations where they have high intensity. At the same time, the desired modes suffer 0 or $2\pi$ phase change, or have low intensity at the discontinuity, and so are unaffected by the discontinuous phase element. Such elements can be used in a single element or a double element configuration, and can be used in passive cavities or active cavities, such as lasers. In addition to being able to improve the output beam quality of a laser by encouraging output of the lowest order mode beam, they can also be used to improve the maximum power output of solid state lasers by encouraging the output of specific higher order mode beams, without limiting dynamic range of the laser. They can also be used to compensate for birefringence distortion in the gain medium.

28 Claims, 10 Drawing Sheets

U.S. PATENT DOCUMENTS

| | | | | |
|---|---|---|---|---|
| 5,283,796 | A | * | 2/1994 | Fink .............................. 372/32 |
| 5,400,173 | A | * | 3/1995 | Komine ....................... 359/330 |
| 5,412,211 | A | | 5/1995 | Knowles |
| 5,473,626 | A | | 12/1995 | Fan et al. |
| 5,745,511 | A | * | 4/1998 | Leger ........................... 372/19 |
| 5,789,748 | A | | 8/1998 | Liu et al. |
| 5,917,844 | A | | 6/1999 | Hill |
| 6,028,869 | A | | 2/2000 | Harada et al. |
| 6,292,505 | B1 | | 9/2001 | Takenaka et al. |
| 6,459,482 | B1 | | 10/2002 | Singh et al. |

OTHER PUBLICATIONS

Casperson, L.W., "Phase Compensation of Laser Beam Modes", *Optical and Quantum Electronics*(UK), vol. 8, No. 6, Nov. 1976, pp. 537–544, XP000560565.

Rioux, M. et al, "High–Order Circular–Mode Selection in a Conical Resonator", *Applied Optics*,vol. 16, No. 7, Jul. 1977, pp. 1791–1792.

Belanger, P.A. et al, "Super–Gaussian Output from a $CO_2$ Laser by Using a Graded–Phase Mirror Resonator", *Optics Letters*, vol. 17, No. 10, May 1992, pp. 739–741.

Green, R.P.M., "Holographic Laser Resonators in Nd:YAG", *Optics Letters*, vol. 19, No. 6, Mar. 1994, USA.

Magni, V., "Resonators for Solid–State Lasers with Large–Volume Fundamental Mode and High Alignment Stability", *Applied Optics*, vol. 25, No. 1, Jan. 1986, pp. 107–117.

Abramski, K.M. et al., "Single–Mode Selection Using Coherent Imaging Within a Slab Waveguide $CO_2$ Laser", *Applied Phys. Letters* vol. 60, No. 20, May 1992, pp. 2469–2471.

Casperson, L.W., "How Phase Plates Transform and Control Laser Beams", *Laser Focus World* (US), May 1994, pp. 223–228, XP002074332.

L.W. Casperson, "How Phase Plates Transform and Control Laser Beams", Laser Focus World, May 1994, pp. 223–228. (on order).

K.M. Abranksi, et al., "Single–Mode Selection Using Coherent Imaging Within a Slab Waveguide CO2 Laser", Applied Physical Letters, vol. 60, 2469–2471 (1992) (on order).

M. Rioux et al., "High–Order Circular–Mode Selection in a Conical Resonator", Applied Optics, vol. 16, pp. 1791–1792 (1977) (on order).

V. Magni "Resonators for Solid State Lasers with Large Volume Fundamental Mode and High Alignment Stability", Applied Optics, vol. 25, pp. 107–117 (1986) (on order).

K. Chenko et al., "Control of the Structure of Transverse Laser Modes by Phase–Shifting Masks", Soviet Journal of Quantum Electronics, US. vol. 10, No. 8, Aug., 1980, pp. 1013–1016 (on order).

International Search Report, dated Dec. 23, 2003, for International Application No. PCT/IL03/00457.

* cited by examiner

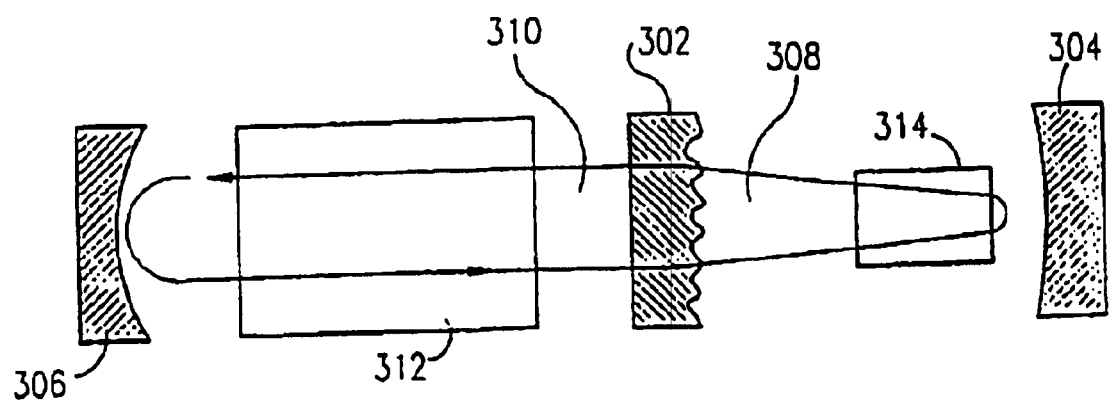
FIG. 16
FIG. 17
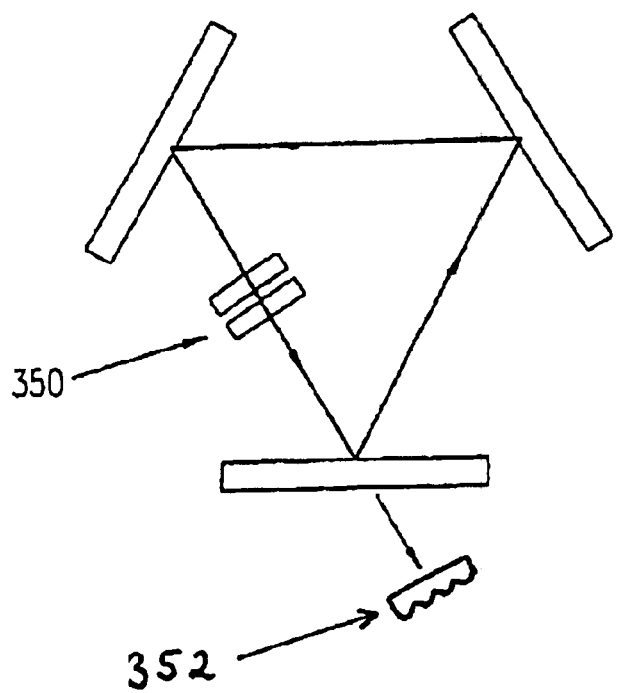

OPTICAL RESONATORS WITH DISCONTINUOUS PHASE ELEMENTS

FIELD OF THE INVENTION

The present invention relates to optical resonators generally and to those used in lasers as specific examples of such resonators.

BACKGROUND OF THE INVENTION

In general, the intensity distribution of output light from optical resonators, especially those used in high power lasers with large apertures, is not uniform but has the form of a pattern of either spots or rings, or a combination of these. Such distributions of output light result from the fact that the light inside an optical resonator is distributed in similar patterns termed modes. The spots and rings of this intensity pattern are so distributed that adjacent spots and adjacent rings have opposite phases ($\pi$ phase shift).

When only the fundamental mode (TEM 00) exists in a resonator, the output light distribution consists of only a single spot, and this mode is considered optimal. However, when higher order modes exist, the light distribution contains multiple spots or rings, so that the focusability and intensity of the output beam decreases. Such a decrease is undesirable for most applications involving laser light.

In order to improve the characteristics of the output light, external phase elements can be introduced into the optical path of the output beam in order to provide controlled phase or amplitude changes to any cross-sectional part of the beam. Examples of such phase elements are presented in the article "How phase plates transform and control laser beams" by Lee W. Casperson, published in Laser Focus World, May 1994, 223–228. In this article, the phase elements are designed to ensure that all portions of the output laser beam are in phase, thereby improving the far field intensity distribution.

With the introduction of a phase element outside the laser, the usual far field distribution of spots is replaced by a single, intense, on-axis spot surrounded by a pattern of much fainter spots. By this means, the intensity of light distribution resulting from a single high order mode can be increased by a factor of ten or more. Unfortunately, such an increase can only occur when the output light distribution results from a single stable mode.

Several methods have been proposed in order to obtain a specific, stable, high order mode, so the total laser output power is high, and the stability is such that the distribution of the beam can be improved by means of an external phase element. These methods have had limited success. For example, in the article "Single-mode selection using coherent imaging within a slab waveguide $CO_2$ laser" published in Applied Physical Letters, Vol. 60, 2469–2471 (1992), K. M. Abramski, H. J. Baker, A. D. Colly and D. R. Hall propose the insertion of a wire grid into the laser resonator for selecting a specific high order mode. Unfortunately, the grid and the adjacent resonator mirror are susceptible to damage through heating of the grid by the inter-cavity flux of energy, particularly during mirror alignment.

Another example involves the use of a conical resonator mirror to obtain a single higher order mode. This method was published by M. Rioux, P. A. Belanger and M. Cormier in the article "High-order circular-mode selection in a conical resonator" in Applied Optics, Vol. 16, 1791–1792 (1977). Unfortunately, it is difficult to predict and obtain a specific distribution of the higher order mode output laser beam in order to design the correct external phase element. In particular, it is difficult to match the orientation of the required external phase element to that of the output light distribution.

In order to obtain a single, stable, lowest order mode TEM 00, an aperture must be inserted into the resonator. When the aperture is small, only the TEM 00 mode with the narrowest field distribution propagates, while higher order modes are eliminated because they are absorbed by the aperture. In general a laser operating with a pure TEM 00 mode has optimal beam quality, but relatively low output power.

In summary it is appreciated that the prior art shows how external phase elements can improve the quality of the output light distribution from an optical resonator, such as a laser. Unfortunately, this improvement cannot be practically implemented with most lasers, especially these operating in multi-mode, so the introduction of external phase elements are indeed limited to very special cases. Furthermore, wires and conical elements used for controlling the modes inside the optical resonator are not practical and tend to reduce the power of the output beam. Intra-cavity apertures, though widely used reduce the laser power output significantly.

The laser design limitations described above are applicable to both gas and solid state lasers. In addition, there are a number of mode design problems specific to solid state lasers, which limit their performance. Solid state lasers are particularly susceptible to a problem known as thermal lensing of the laser rod, which constitutes the gain material in such lasers. Thermal lensing occurs when the shape or the optical properties of the laser rod change because of the high thermal stresses set up within the rod at high input power levels. The optical elements in a solid state laser are designed to create an optimal mode shape while taking into account thermal lensing of the gain medium at the output power levels at which the laser is designed to operate. However, if the output power of the laser is changed, the thermal lensing of the gain medium changes, and the optical resonator no longer supports the optimal mode shape. Furthermore, in extreme cases the optical resonator becomes unstable and the output power of the laser drops to zero.

The input power levels to the gain medium over which the optical resonator remains stable define the dynamic range of the laser. It has been shown by Vittorio Magni in the article "Resonators for solid state lasers with large volume fundamental mode and high alignment stability" published in Applied Optics, Vol.25, 107–117 (1986) that the dynamic range of a solid state laser is inversely proportional to the width of the Gaussian mode (0,0) inside the gain medium. The maximum output power is proportional to the width of this mode. Therefore, the dynamic range is inversely proportional to the maximum output power from the laser. This means that when designing a laser, a compromise must be made between the maximum output power of the laser and its dynamic range. This significantly limits the laser's usefulness.

Another problem which limits the performance of solid state lasers arises from the optical distortions set up in the mode structure because of the birefringent nature of the lasing rod. The birefringence introduces areas of circular polarization into the mode because of the different phase shifts introduced along the different crystal axes, and thereby degrades the quality of the laser output beam.

SUMMARY OF THE INVENTION

The present invention seeks to provide an improved optical resonator with an improved output beam.

There is thus provided in accordance with a preferred embodiment of the present invention an optical resonator comprising reflector elements and with at least one discontinuous phase element disposed between the reflector elements. The reflector elements may be full reflectors or output couplers.

The optical resonator may be a passive or active optical resonator. If the optical resonator is an active optical resonator, it may be embodied in a laser, such as an axial laser or a ring laser. The resonator may be a stable or an unstable resonator.

The discontinuous phase element may be embodied in at least one reflector or output coupler or may be positioned adjacent to an optical element or may be placed inside the resonator at a defined point which images onto itself by reflection from one of the above optical components of the resonator.

The discontinuous phase element may provide discontinuous phase change as well as one or more of angular, linear or radial phase change.

The optical resonator may also comprise an external discontinuous phase element operative in addition to the internal element, in order to cancel distortions and eliminate phase discontinuities in the output beam from the optical resonator.

The invention operates by producing sharp changes in the phase distribution of the undesirable modes, so that their propagation losses are sufficiently high to prevent their existence. This is done by introducing a discontinuous phase change to these modes at locations where they have high intensity.

In general the intensity of resonator modes is distributed in well-defined patterns of spots or rings, the phases of neighboring spots or rings having opposite sign ($\pi$ phase shift). It is possible to predict the field distribution (amplitude and phase) of any mode propagating.

This invention ensures that generally only one desired mode propagates in the optical resonator, with a defined intensity distribution. This is done by incorporating two discontinuous phase elements that introduce different phase changes to different parts (spots and rings) of the mode distribution. In addition, the elements are designed and aligned to ensure that the discontinuous phase change in each element falls at the interfaces between neighboring parts of the selected mode structure, where the intensity is very low. The phase changes introduced by each element must be of opposite sign, so that the sum of the combined phase change is either zero or a multiple of $2\pi$.

If the distance between the two discontinuous phase elements inside the resonator is sufficiently short, then the total intensity distribution of the desired mode does not change as it passes through the two elements because the phase change introduced by one element is canceled by the other. The other, undesired modes have a different distribution of intensity, so that when they pass through the first discontinuous phase element, they suffer a sharp phase change at locations where their intensity is strong. This results in a strong divergence, so that the second discontinuous phase element can no longer cancel the phase changes introduced by the first element. These modes therefore suffer a loss of intensity and are suppressed.

Similar results can be achieved by using only a single discontinuous phase element. With the single element, the phase change introduced by the element must be either zero or $\pi$, and the element should be located near one of the resonator mirrors, preferably near the output coupler mirror.

After the desired mode passes once through the element, all parts of its intensity distribution are in phase (zero or $2\pi$ phase difference). The mirror then reflects the modified mode so it passes once more through the element, and all parts of the intensity distribution return to their original phase. This is due to the fact that the total phase change introduced by the element is $2\pi$, which is equivalent to no change at all.

It is possible for the second passage of the mode through the discontinuous phase element to take place at a point in the resonator far from that of the first passage, on condition that the two passages are made at planes which are conjugate image planes produced by some optical component in the resonator.

An additional phase element may be placed outside the resonator in order to further improve the output beam. This element can easily be characterized since the resonator output beam originates from a single well defined stable mode.

A suitably constructed discontinuous phase element may be inserted at the correct position into the cavity of a solid state laser designed with a conventional optical resonator to support a narrow Gaussian mode. The addition of the discontinuous phase element forces the resonator to oscillate in a high order mode, resulting in a laser which combines high maximum output power without the limitations of dynamic range of the conventional cavity.

Likewise, a suitably constructed discontinuous phase element inserted into the cavity of a solid state laser at the correct position, can also compensate for birefringence distortions introduced by the gain medium.

Likewise, a suitably constructed discontinuous phase element can be inserted into the cavity of a laser that has a flat output coupler and a curved full reflector. The placement of the discontinuous phase element adjacent to the flat output coupler leads to lower divergence of the output beam.

Likewise, a suitably constructed discontinuous phase element inserted into the cavity of an unstable resonator laser at the correct position, will force the resonator to oscillate in a high order mode, and will thereby prevent the high intensity center spot produced in unstable resonators operating in the lowest order mode.

Thus, in accordance with the above embodiments, single mode operation and high beam quality can be achieved even in a resonator with a large aperture and hence, high output power. The design of the discontinuous phase element can vary from one resonator to the other but there are several inherent features common to all such elements. The phases of these elements all have lines of discontinuity, and these lines are positioned where the intensity of the desired mode is expected to be very low. In addition, the discontinuous phase changes are introduced to the mode inside the resonator at planes which are located at defined distances from each other.

BRIEF DESCRIPTION OF THE DRAWINGS

The present invention will be understood and appreciated more fully from the following detailed description taken in conjunction with the drawings, in which:

FIG. 1A shows such a laser with a curved output coupler, while FIG. 1B shows a similar laser with a flat output coupler.

FIG. 16 is an illustration of an axial laser with one discontinuous optical element placed close to a plane which is imaged onto itself after reflection from the back mirror. This situation is optically equivalent to placing the element close to the output coupler;

FIG. 17 is an illustration of a ring laser with two discontinuous optical elements placed close to each other. A third element is placed outside the resonator in order to improve the output beam;

DETAILED DESCRIPTION OF PREFERRED EMBODIMENTS

Figure 1A:
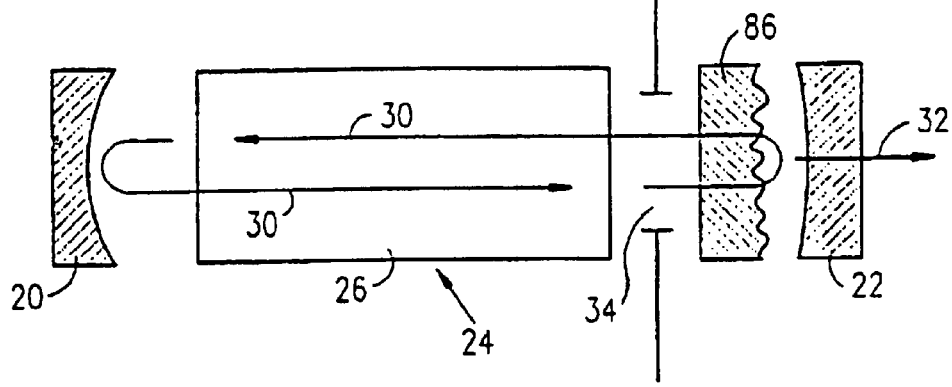
FIGS. 1A and 1B are schematic illustrations of axial lasers constructed and operative in accordance with a preferred embodiment of the present invention.

Reference is now made to FIG. 1 which is a schematic illustration of an axial laser, as an example of an optical resonator, constructed and operative in accordance with a preferred embodiment of the present invention. The axial laser comprises reflectors, preferably a fill reflector 20 and a partial reflector or an output coupler 22, disposed at opposite ends of an optical resonator 24, which contains a gain medium 26, and with a discontinuous phase element 86 located between the full reflector 20 and the output coupler 22.

A mode, indicated by reference number 30, is seen to propagate back and forth between the reflector 20 and the output coupler 22, while passing through the gain medium 26. A beam of light 32 is emitted through the output coupler 22. The width of mode 30 inside the laser is influenced by an aperture 34.

In accordance with a preferred embodiment of the invention, the laser of FIG. 1A is characterized in that it includes at least one discontinuous phase element operative to introduce discontinuous phase changes to the modes propagating inside the resonator, so that the divergence of the undesirable modes is greater than that of the desired mode. This results in a broadening of the undesirable mode intensity distribution, preventing their propagation in the laser. Thus the undesirable modes are suppressed, thereby improving the quality of the output beam.

Preferably, one discontinuous phase element is employed. This element should be placed close to the output coupler but not too close. Alternatively, the element can be placed near a plane that can be imaged onto itself by the optics of the laser. When two elements are used, they should be placed close to each other or close to two planes that can be imaged onto each other by the optics inside the laser.

Figure 1B:
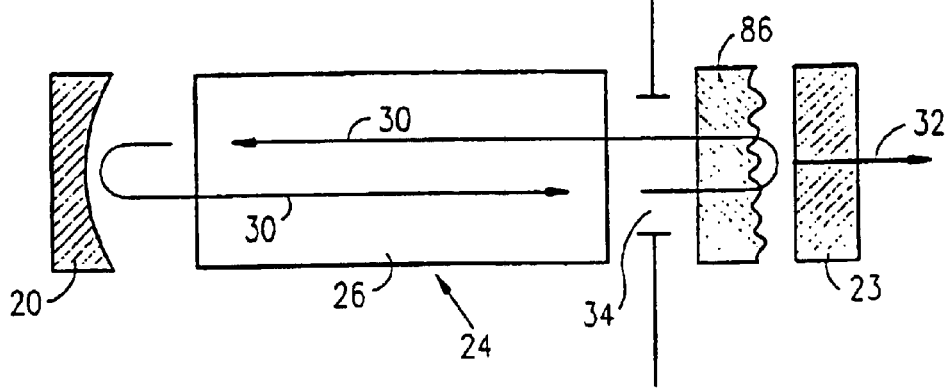

There are a number of alternative optical configurations of such axial lasers, wherein the output coupler and full reflector can have different curvatures, concave or convex, or even be flat. FIG. 1B shows one such configuration, commonly used in industrial lasers, in which the output coupler 23 is flat, and the full reflector 20 is concave, like that of the laser shown in FIG. 1A. Discontinuous phase elements can be used to improve the output beams of all these types of lasers. For example, a discontinuous phase element 86 inserted into the cavity configuration shown in FIG. 1B, next to the flat output coupler 23, results in low divergence of the output beam 32, while the curved full reflector may compensate for lensing effects of the gain medium.

Two alternative embodiments of an output coupler arrangement including a discontinuous phase element are now described with reference to FIGS. 2 and 3.

Figure 2:
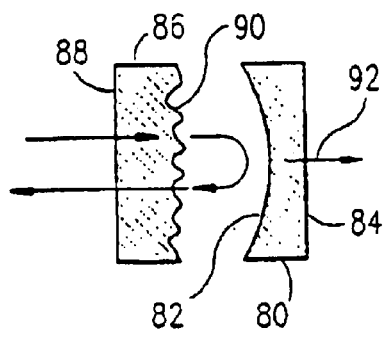
FIG. 2 is a schematic illustration of an output coupler arrangement useful in the laser of FIG. 1A, and including a combination of a conventional output coupler and a discontinuous phase element.

FIG. 2 is a schematic illustration of an output coupler arrangement useful in the laser of FIG. 1A and including a combination of a conventional output coupler 80, with a discontinuous phase element 86.

The conventional output coupler is preferably coated with a partial reflecting coating on surface 82 and an antireflection coating on surface 84. The discontinuous phase element is coated with an antireflection coating on both surfaces 88 and 90.

The discontinuous phase element is constructed to be compatible with the desired mode intensity distribution.

Specifically, it is desired to form phase discontinuities at locations where the desired mode has little or no intensity. The magnitude of each phase discontinuity is π, so that after the desired mode passes once through the discontinuous phase element, all parts of the cross-sectional intensity distribution of the desired mode have the same phase. After the second pass through the element the desired mode returns to its original distribution.

Figure 3:
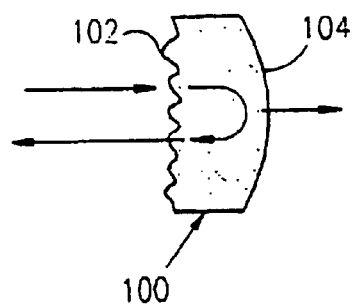
FIG. 3 is a schematic illustration of an output coupler arrangement useful in the laser of FIG. 1A and including a hybrid element which consists of an output coupler and a discontinuous phase element.

The embodiment of FIG. 3 combines elements 80 and 86 of the embodiment of FIG. 2 to achieve a single hybrid element 100 having less surfaces. The surface 102 of the hybrid element may have the same form as surface 90 in the embodiment of FIG. 2, while the partially reflective surface 104 may have the same form as surface 82 in embodiment of FIG. 2.

Figure 4:
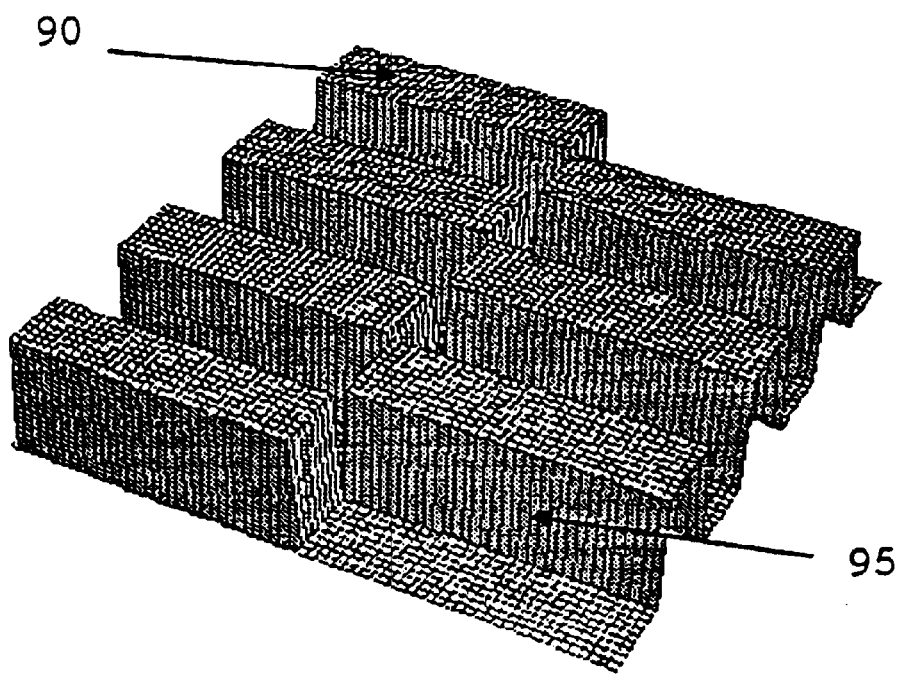
FIG. 4 is a schematic illustration of a discontinuous phase element designed to select mode (6,1) in a rectangle resonator.
Figure 5:
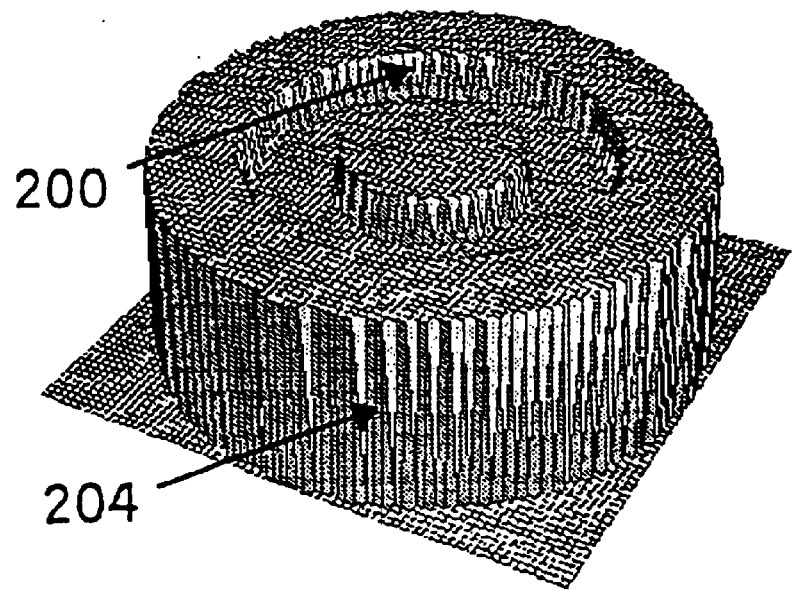
FIG. 5 is a schematic illustration of a discontinuous phase element designed to select mode (2,0) in a cylindrical resonator.
Figure 6:
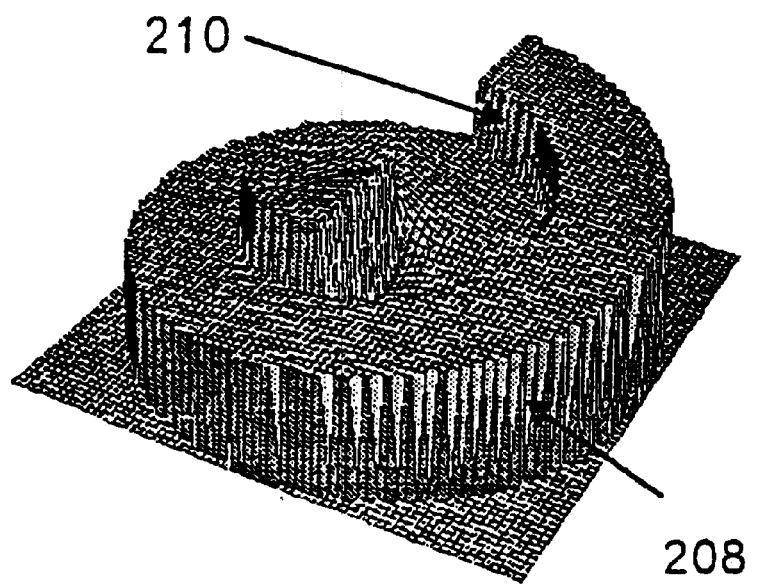
FIG. 6 is a schematic illustration of a discontinuous phase element combined with a spiral phase element. This element is designed to select mode (1,1)* in a cylindrical resonator.

FIGS. 4, 5 and 6 present examples of discontinuous phase elements constructed to select various types of modes. These elements may be realized by photolithograghic methods, by mechanical methods such as diamond turning, by mechanical methods such as graded index elements or any other method which produces an element that its changes the phase of a wave-front.

FIG. 4 presents a schematic illustration of a discontinuous phase element constructed to select mode (6,1) in a rectangle resonator. In mode (6,1) there are 14 sections in which the energy is concentrated. The element is designed to have constant phases at each location 90. The discontinuous lines 95 are located at the boundaries of these sections.

FIG. 5 presents a schematic illustration of a discontinuous phase element 204 constructed to select mode (2,0) in a cylindrical resonator. The mode notation (r,θ) indicates the number of radial. r, and angular, θ, nodes in a cylindrical mode pattern The intensity distribution in the (2,0) mode is distributed in rings, where adjacent rings provide a π phase shift, and the discontinuities 200 are circles.

FIG. 6 presents a schematic illustration of a discontinuous phase element 208 combined with a spiral phase element. The element is constructed to select mode (1,1)* in a cylindrical resonator. This cylindrical mode is unlike that previously described in FIG. 5, in that it has angular as well as radial phase distribution. It appears as two concentric rings. The circular discontinuities 210 select the desired radial distribution, and discriminate between other (n,1)* modes, which have a different number of rings, according to the value of n. The spiral element selects the desired angular phase distribution of the mode and ensures that modes with a different angular distribution suffer rapid broadening and decay after very few traverses of the element.

Figure 7:
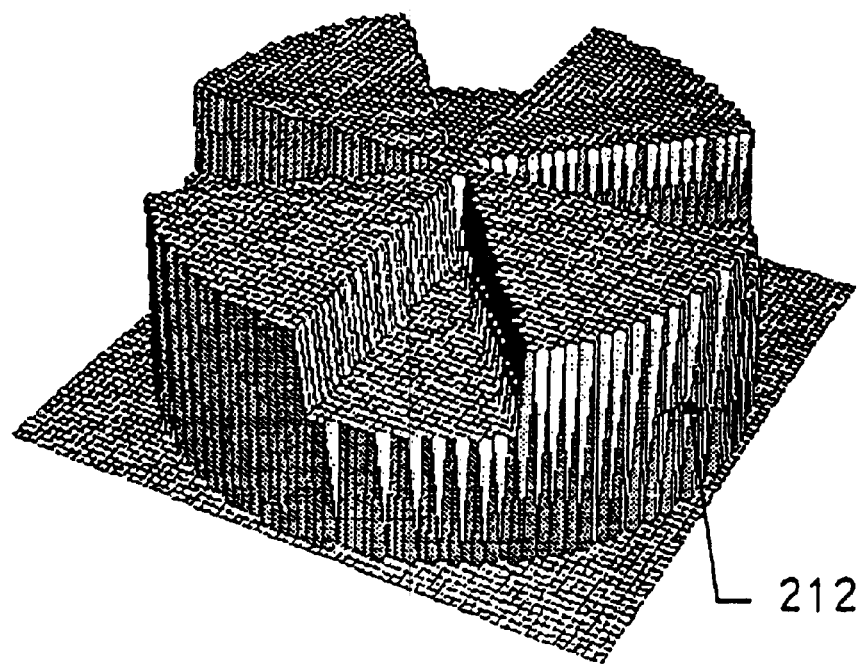
FIG. 7 presents a schematic illustration of a discontinuous phase element 212 designed to select mode (0,4) in a cylindrical resonator.
Figure 8A:
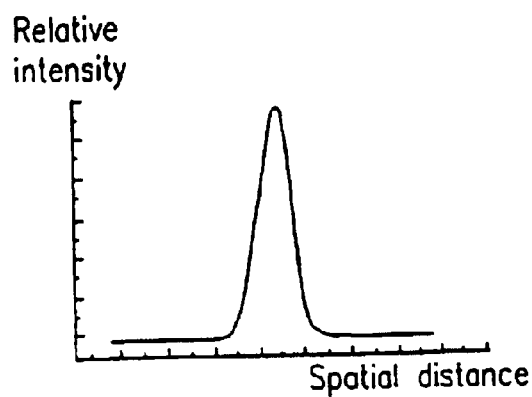
FIGS. 8A, 8B, 8C and 8D are cross-sections of the intensity distribution of the first four modes having the lowest intensity loss, inside a rectangular conventional resonator.
Figure 8B:
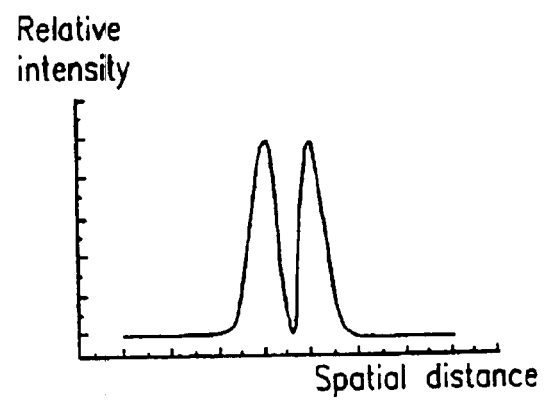
Figure 8C:
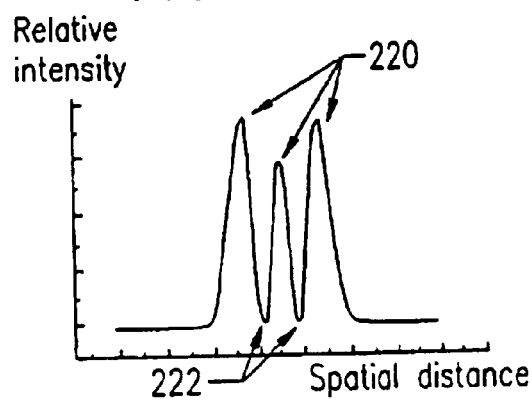
Figure 8D:
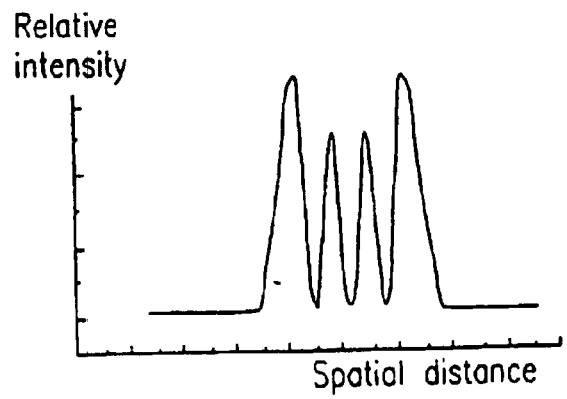

FIG. 7 presents a schematic illustration of a discontinuous phase element 212 constructed to select mode (0,4) in a cylindrical resonator. Such an element is insensitive to radial perturbations of the amplitude distribution of the mode, such as would accrue from the effects of thermal lensing in a solid state laser.

The mechanism for mode discrimination and consequent output beam quality improvement according to the present invention will now be described with the aid of FIGS. 8A–D, 9, 10, 11, 12, 13A–D, 14 and 15.

FIGS. 8A, 8B, 8C and 8D present the intensity distributions of the first four modes having the lowest intensity loss, inside a rectangle conventional resonator. The intensity is distributed in a well defined sections 220 with significant intensities, separated by sections 222 with little, if any, intensity.

Figure 9:
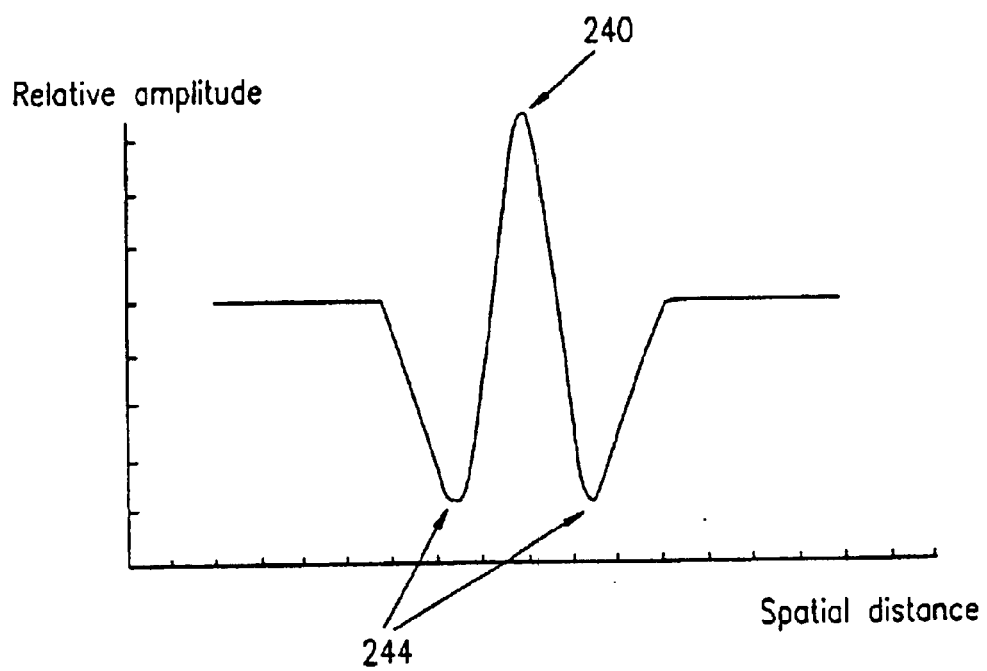
FIG. 9 is an illustration of the amplitude distribution of mode (2,0) in a rectangular resonator.

FIG. 9 shows the amplitude distribution of mode (2,0) in a rectangle resonator. The corresponding intensity distribution of this mode was presented in FIG. 8C. The amplitude of this mode is positive in the central section 240 and negative in the two side sections 244.

Figure 10:
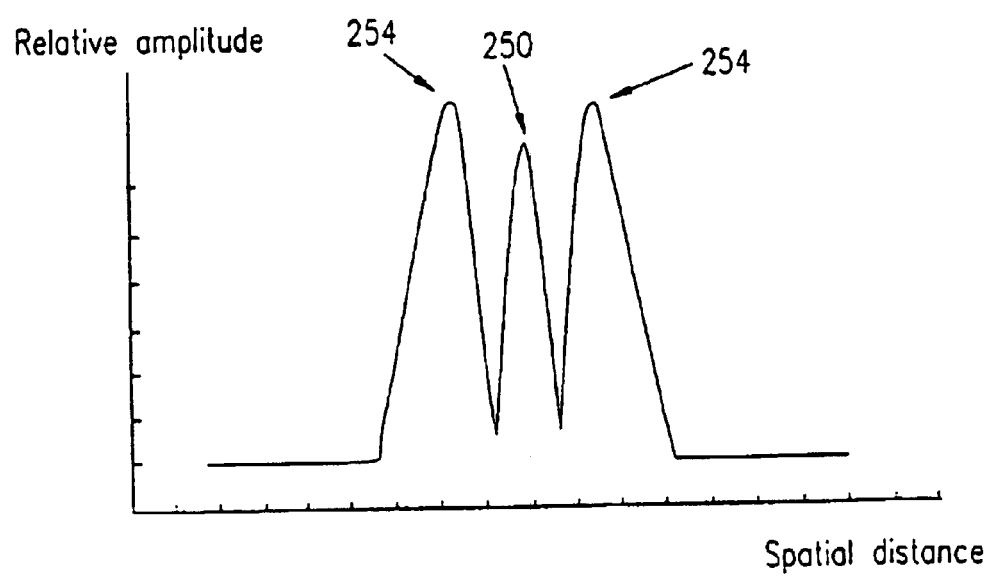
FIG. 10 is an illustration of the amplitude distribution of mode (2,0) which was presented in FIG. 8C, after passing through the discontinuous phase element.

FIG. 10 shows the amplitude distribution of the mode (2,0) presented in FIG. 9, after passing once through the discontinuous phase element designed to select this mode. The sign of the amplitude in the central section 250 as well as in the side sections 254 are now all positive. This shape of the mode converges slowly as the mode propagates, and a converging output beam exits the output coupler located next to the discontinuous phase element. Some of the mode is reflected from the output coupler, as illustrated in FIGS. 2 and 3, and passes again through the discontinuous phase element. The optical path between the first passage and the second passage through the phase element is very short, so that after the second passage through the phase element, the amplitude distribution of the mode returns to its original distribution shown in FIG.9.

Figure 11:
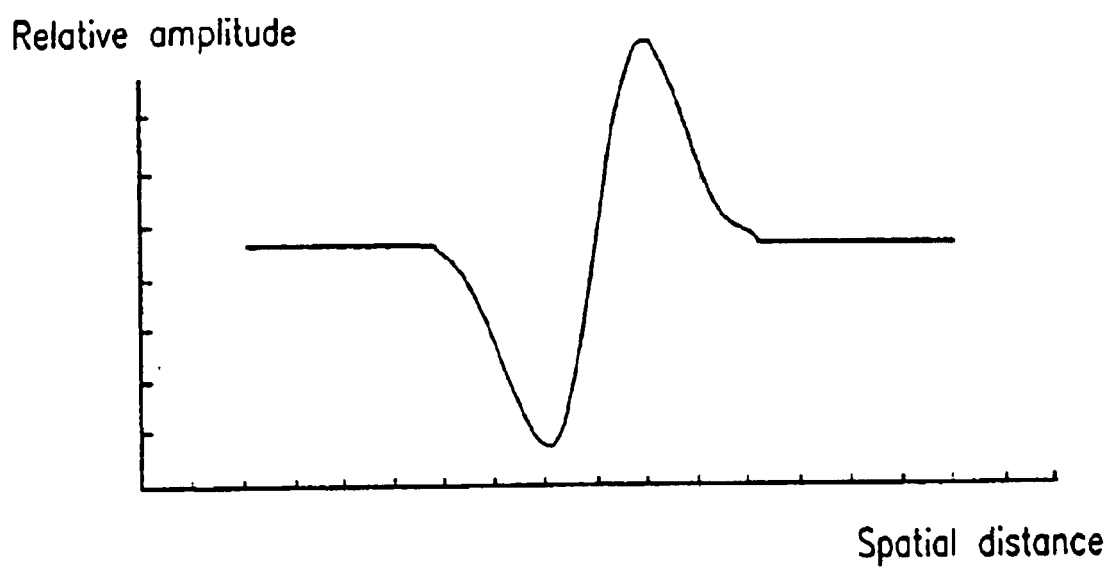
FIG. 11 is an illustration of the amplitude distribution of mode (1,0) in a rectangular resonator.
Figure 12:
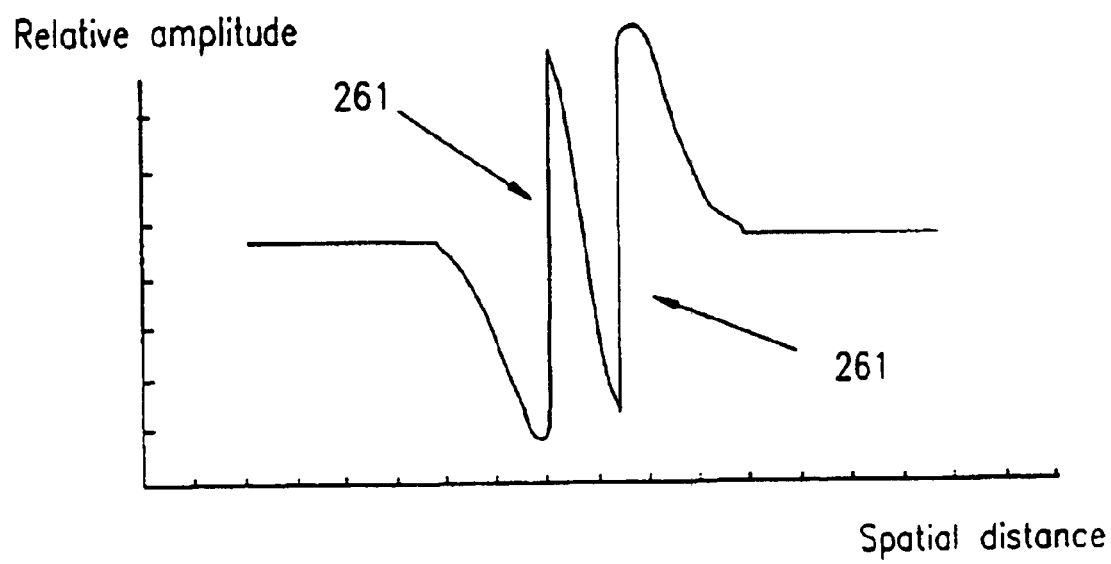
FIG. 12 is an illustration of the amplitude distribution of mode (1,O) which was presented in FIG. 11, after passing through the discontinuous phase element designed to select mode (2,0)
Figure 13A:
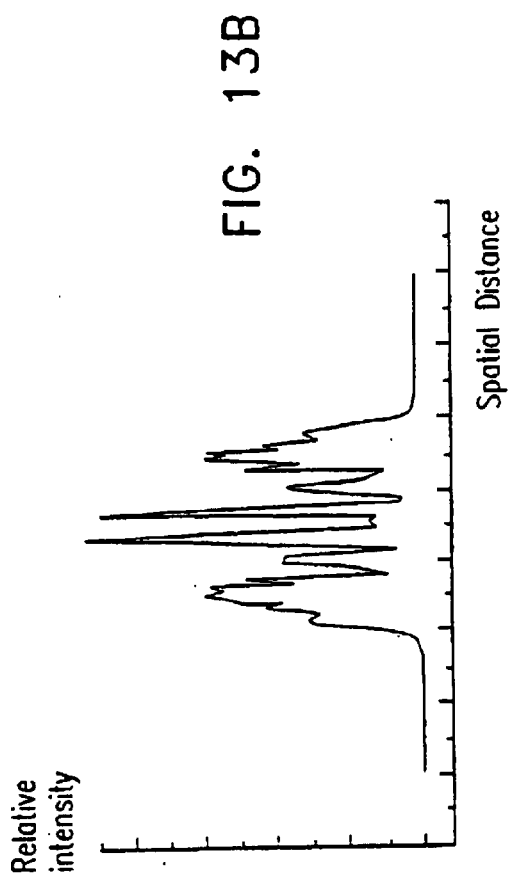
FIGS. 13A. 13B, 13C and 13D are cross-sections of the intensity distributions of the first four modes having the lowest intensity loss, inside a rectangular resonator with a discontinuous phase element designed to select mode (2,0)
Figure 13B:
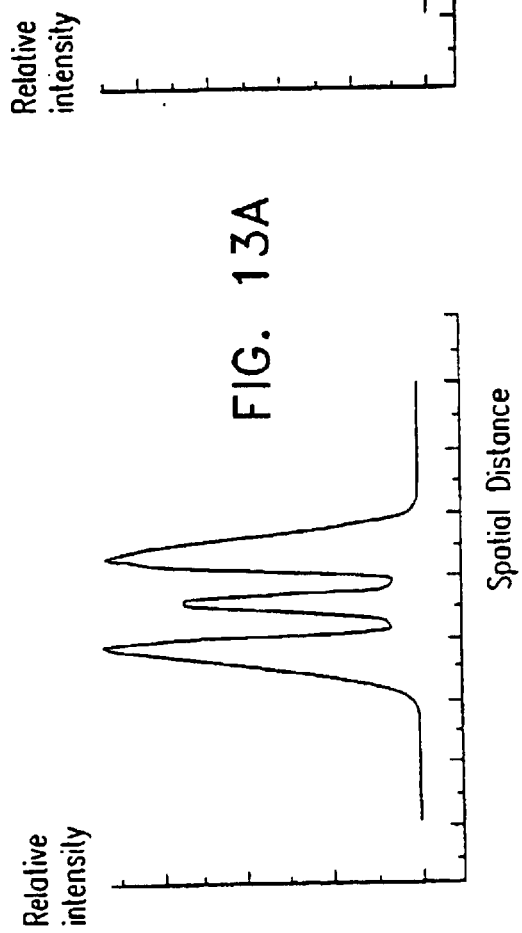
Figure 13C:
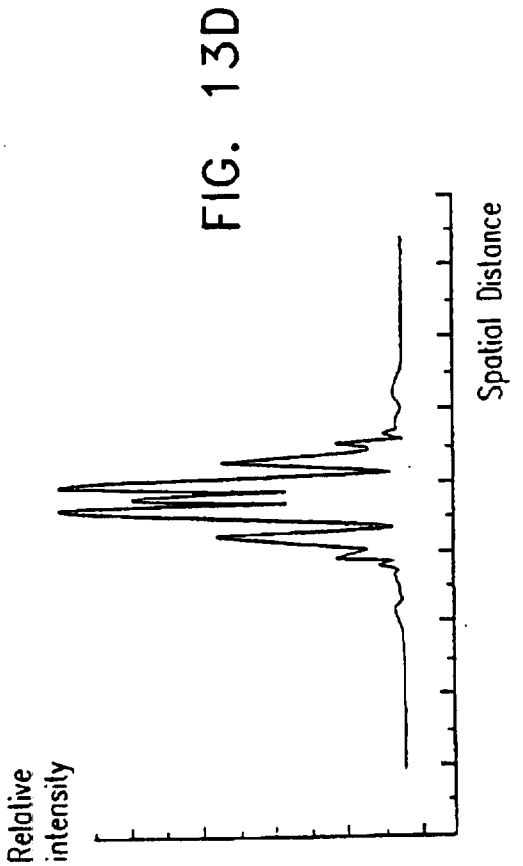
Figure 13D:
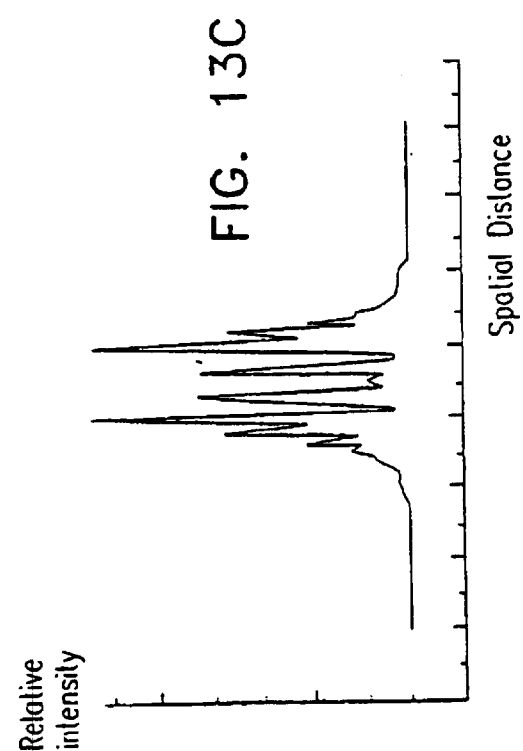

Other modes with a differing amplitude distribution are affected differently by the passage through the discontinuous phase element, so they rapidly decay and cease to exist as will be illustrated with the example shown in FIGS. 11 and 12.

FIG. 11 presents the amplitude distribution of mode (1,0).

FIG. 12 presents the amplitude distribution of mode (1,0) shown in FIG. 11, after if passing once through the discontinuous phase element designed to select mode (2,0). Two sharp discontinuous phase shifts 261 are introduced at locations where the amplitude of mode (1,0) is significant. These discontinuities ensure that mode (1,0) diverges rapidly so that it does not return to its original shape after the second passage through the phase element. As a result, a large intensity loss for mode (1,0) accrues and this mode ceases to exist.

FIGS. 13A, 13B, 13C and 13D present the intensity distributions of the first four modes having the lowest intensity losses, inside a rectangle resonator with a discontinuous phase element designed to select mode (2,0). Only the intensity distribution of the desired mode (2,0), presented in FIG. 13A remains the same. The distributions of the other modes are distorted, and, being strongly attenuated, die out after a small number of resonator traverses.

Figure 14:
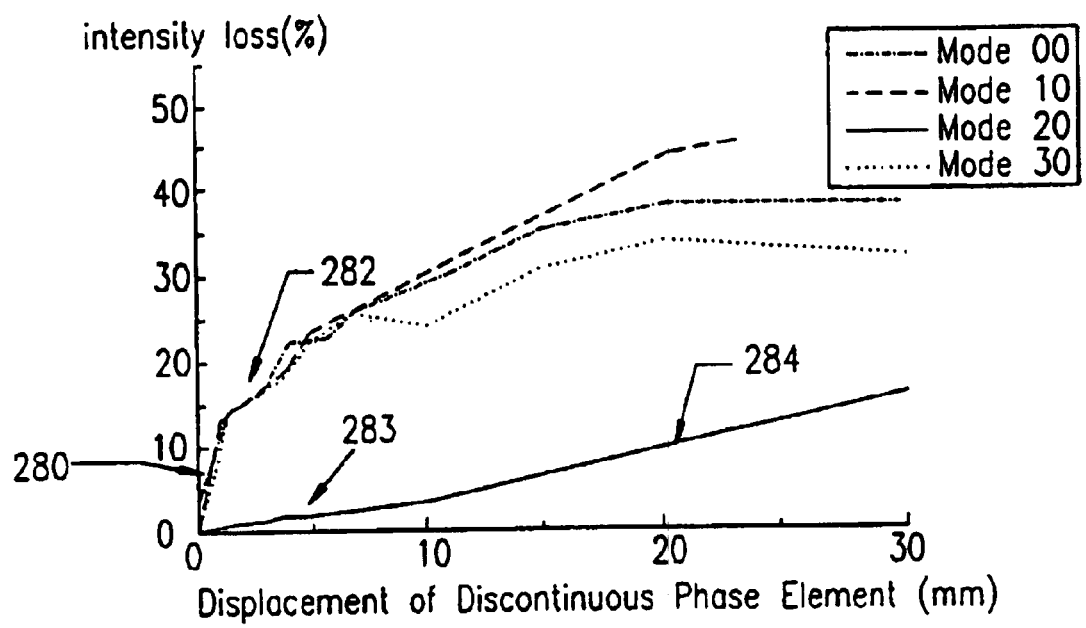
FIG. 14 presents the intensity loss of the four lowest order modes in a rectangular resonator designed to select mode (2,0), as a function of the axial displacement of the discontinuous phase element from the output coupler.

FIG. 14 presents the losses for the four lowest order modes as a function of distance of the discontinuous phase element from the output coupler, for a rectangular axial resonator. The discontinuous phase element is designed to select mode (2,0). If the discontinuous phase element is placed very close or against the output coupler 280, even the undesired modes are not distorted by the phase element, since there is no axial space for them to diverge before being reflected back for a second passage through the discontinuous phase element, where they are converted back to their original amplitude distribution. When the distance between the discontinuous phase element and the output coupler increases, then the undesired modes immediately start to diverge, resulting in sharply increased losses 282, while the desired mode have little loss 283. At a slightly increased distance, only the desired mode exist inside the laser. When the distance between the discontinuous phase element and the output coupler increases further, even the desired mode has a significant loss of intensity 284.

Figure 15:
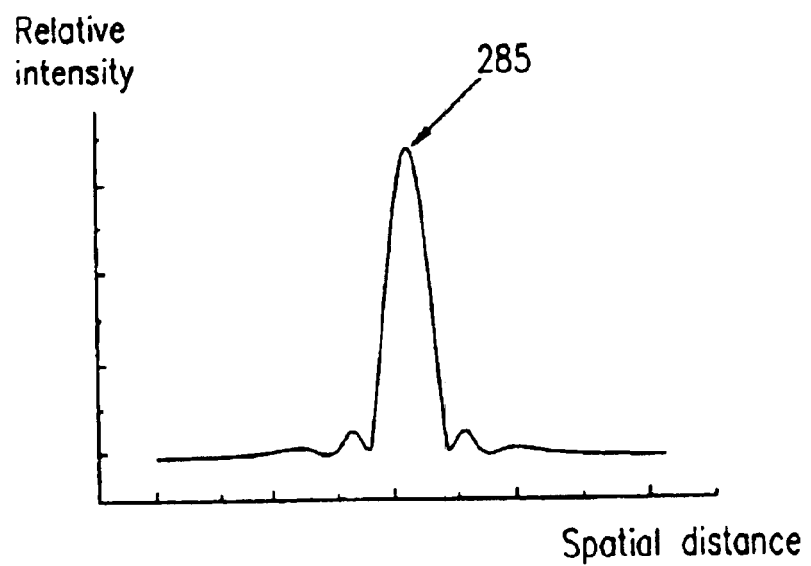
FIG. 15 is a description of the far field of the output beam from a resonator with a discontinuous phase element designed to select mode (2,0). The beam converses to a single lobe with high intensity and good quality.

FIG. 15 presents the far field intensity distribution of the output beam resulting from mode (2,0). As is evident, the beam converges to a single lobe with high intensity and good quality 285.

Reference is now made to FIG. 16, which schematically presents a configuration of an axial laser with a single discontinuous phase element 302 placed at an arbitrary point inside the resonator and not close to the output coupler 304 or the reflector 306. In this embodiment the phase element is placed close to a point that is being imaged to itself by the output coupler 304 and/or the reflector 306, or by any other optical elements inside the resonator. This imaging configuration resembles the configuration with two phase elements placed close to each other.

In this embodiment the intensity distribution of the selected mode is different in each of two axial sections of the overall laser. In the first section 308, on the output coupler side of the discontinuous phase element, the mode is converging and its crosssectional intensity is high because the phases of all parts of the intensity pattern are the same. In the second section 310, on the reflector side of the discontinuous phase element, the shape of the mode is broad with low intensity because the phases of some parts of the intensity pattern are not the same. This embodiment is applicable, for example, in lasers which use the nonlinear properties of crystals for changing the radiation wavelength and/or for mode locking. The broader section 310, with its high filling factor, is useful for efficiently obtaining increased gain from the gain medium 312, while the narrow section 308, with its high field intensity, is useful for wavelength conversion by the nonlinear crystal 314.

Reference is now made to FIG. 17, which schematically presents a ring resonator having two discontinuous phase elements. The optical properties of these elements are the same as described earlier. The discontinuous phase elements 350 are designed to have opposite phases, so together do not influence the distribution of the desired mode. Other modes are distorted, however, as previously described in the axial laser case. In this configuration the phase discontinuities introduced by the elements may be arbitrary and need not be exactly $\pi$. The intensity distribution of the output beam is the same as that of the mode inside the laser. Thus, in order to improve the distribution of the output beam a third external phase element 352 must be introduced at the output from the laser.

Alternative configurations for this ring embodiment are similar to those presented for the axial resonator. The two phase elements can be combined into a single element with phase patterns on both sides. They can be placed far apart, provided that they are imaged onto each other by some optical element in the resonator. A single phase element can be used instead of two, provided that after one round-trip, the emerging wave-front from the element is imaged onto itself.

FIGS. 18, 19, 20 and 21 describe how a discontinuous phase element compensates for the problem of birefringence distortion in the gain medium of a solid state laser.

Figure 18:
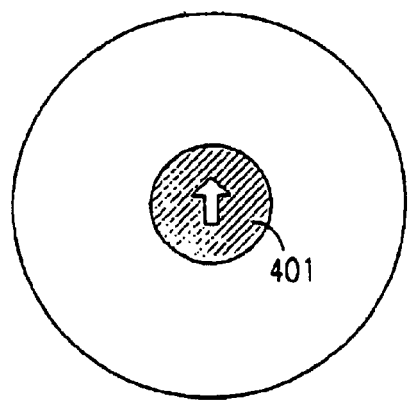
FIG. 18 is a representation of the linear polarization of the (0,0) mode in a cylindrical Nd:YAG crystal of a solid state laser.

FIG. 18 is a schematic illustration of mode (0,0) marked as 401. The arrow in the illustration represents the linear polarization of this mode. After this mode passes once through the distorting medium, for example a cylindrical Nd:YAG crystal, its polarization is distorted.

Figure 19:
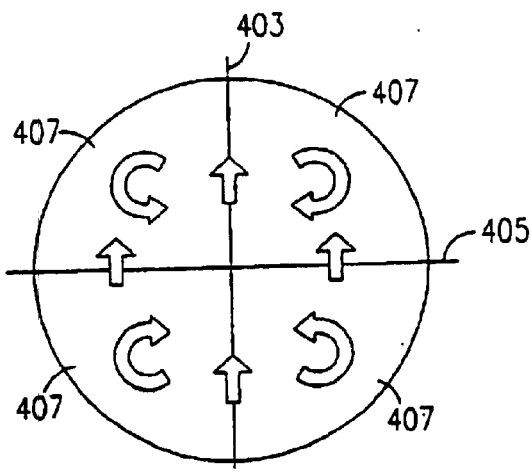
FIG. 19 is a schematic illustration of the polarization distortion introduced into the (0,0) mode because of the birefringence of the crystal of FIG. 18.

FIG. 19 is a schematic illustration of the polarization distortions introduced to the mode by the crystal due to birefringence. The primary axes of the polarization are marked as 403 and 405. Along these axes, the polarization remains linear, but different phase shifts are introduced to the mode along them. In between these axes, the polarization of the mode becomes circular (407). The circular polarization and the phase shifts introduced to the different sections of the mode, distort the mode and consequently reduce the quality of the output beam of the laser.

Figure 20:
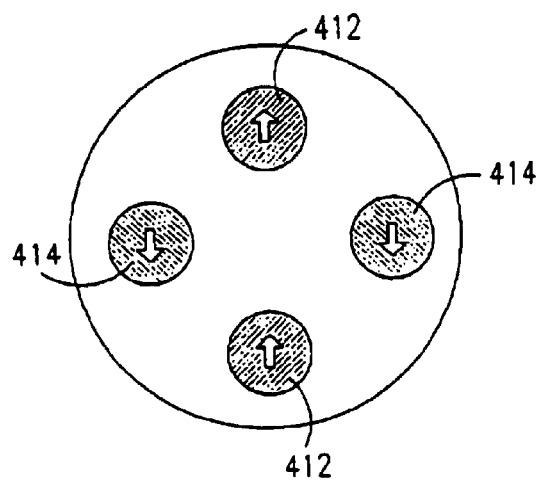
FIG. 20 is a view of the polarization structure of the (0,2) cylindrical mode in the Nd:YAG crystal of a solid state laser, showing the $\pi$ phase shift between adjacent parts of the mode structure.

FIG. 20 describes, schematically, mode (0,2) in cylindrical coordinates. The arrows represent a linear polarization where sections 412 and sections 414 of the mode have $\pi$ phase shift between them, as previously described. After this mode passes through the distorting gain medium, small areas with circular polarization arise, although most of the energy of the mode is concentrated along the primary axes. However, the phase difference between the various sections 412 and 414 is no longer $\pi$. This phase distortion can be easily compensated by the use of a suitable discontinuous phase element.

Figure 21:
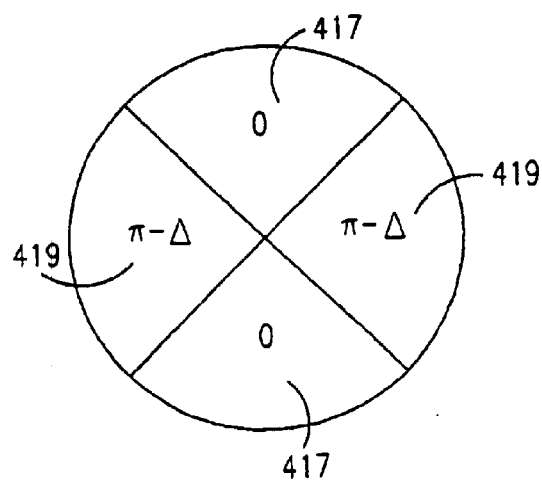
FIG. 21 is a schematic illustration of a single discontinuous phase element designed to select mode (0,2) and to compensate for birefringence in the Nd:YAG crystal of a solid state laser.

FIG. 21 is a schematic illustration of a single discontinuous phase element designed to select mode (0,2) and to compensate for birefringence in the gain medium described in FIG. 19. The phase difference between the various sections of the element (417 and 419) is $\pi$-$\Delta$, where $\Delta$ is the phase difference introduced into the two sections of the mode (412 and 414) by the birefringence distortion of the gain medium.

It will be appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. An optical resonator comprising reflector elements and at least one static discontinuous phase element disposed between said reflector elements, said at least one discontinuous phase element having planar regions and at least one sharp discontinuity defining a boundary between said planar regions, said at least one discontinuous phase element being aligned such that said planar regions introduce a discontinuous phase change to separate regions of field distributions in at least one desired mode propagating in said resonator, such that said separate regions of said field distributions of said at least one desired mode, after traversing said element, are generally in phase, and said at least one sharp discontinuity being operative to produce a change in the phase of at least one undesired mode of said resonator, and being disposed at a location corresponding to an area of significant intensity of said at least one undesired mode, whereby the divergence of said at least one undesired mode is greater than that of said at least one desired mode and propagation of said at least one undesired mode is suppressed.

2. An optical resonator according to claim 1, and whose said reflector elements are at least one full reflector and an output coupler.

3. An optical resonator according to claim 1, and being a passive optical resonator.

4. An optical resonator according to either of the preceding claims 1 and 2, and being an active optical resonator.

5. An optical resonator according to claim 1, and being the resonator of a laser.

6. An optical resonator according to claim 1, and being the resonator of a ring laser.

7. An optical resonator according to claim 1, and being a stable resonator.

8. An optical resonator according to claim 1, and being an unstable resonator.

9. An optical resonator according to claim 1, and wherein said at least one discontinuous phase element is embodied in a reflector of said optical resonator.

10. An optical resonator according to claim 1, and wherein said at least one discontinuous phase element is embodied in an output coupler of said optical resonator.

11. An optical resonator according to claim 1, and wherein said at least one discontinuous phase element is positioned adjacent to an optical element of said optical resonator.

12. An optical resonator according to claim 1, and wherein said at least one discontinuous phase element is placed inside said optical resonator at a defined point which is imaged onto itself from an optical element within the resonator.

13. An optical resonator according to claim 2, and wherein said at least one discontinuous phase element is positioned adjacent to a flat output coupler of said optical resonator, and the full reflector of said resonator is curved.

14. An optical resonator according to claim 1, and wherein said at least one discontinuous phase element also provides at least one of angular, linear and radial phase change.

15. An optical resonator according to claim 1, and also comprising an external discontinuous phase element having at least one sharp discontinuity, operative in addition to said at least one discontinuous phase element disposed between said reflector elements, in order to improve an output beam from said optical resonator.

16. An optical resonator according to claim 1, and wherein said at least one discontinuous phase element changes the phase of predetermined parts of a desired mode of said resonator, such that generally all parts of the emerging field distribution of said mode are in phase.

17. An optical resonator according to claim 1, and wherein said at least one discontinuous phase element is disposed such that said at least one sharp discontinuity falls in a region of high intensity of at least one undesirable mode of said resonator.

18. An optical resonator according to claim 17, and wherein said at least one discontinuous phase element causes the divergence of said at least one undesirable mode in said resonator to be greater than that of a desired mode, such that propagation of said undesirable mode is decreased.

19. A method of improving the output beam quality of a laser, comprising the steps of:

providing a laser resonator having reflector elements and a gain medium;

disposing at least one discontinuous phase element between said reflector elements, said at least one discontinuous phase element having planar regions and at least one sharp discontinuity defining a boundary between said planar regions, said at least one discontinuous phase element being aligned such that said planar regions introduce a discontinuous phase change to separate regions of field distributions in at least one desired mode propagating in said laser resonator such that said separate regions of said field distributions of said at least one desired mode, after traversing said element, are generally in phase, and said at least one sharp discontinuity being operative to produce a change in the phase of at least one undesired mode of said resonator, and being disposed at a location corresponding to an area of significant intensity of said at least one undesired mode, whereby the divergence of said at least one undesired mode is greater than that of said at least one desired mode and propagation of said at least one undesired mode is suppressed.

20. The method of claim 19, and also comprising the step of selecting said at least one discontinuous phase element such that said laser resonator oscillates in at least one mode having a higher order than the Gaussian mode such that said output beam of said laser has a higher power than that of the Gaussian mode.

21. The method of claim 20, and wherein said at least one higher order mode is a single mode.

22. The method of claim 20, and wherein said laser is an unstable resonator laser.

23. The method of claim 20, and wherein said laser is a solid state laser.

24. The method of claim 23, and wherein said higher power of said output beam does not limit the dynamic range of said laser.

25. The method of claim 23, and wherein said at least one discontinuous phase element is selected such that compensation is provided for birefringence distortion introduced by said gain medium.

26. The method of claim 23, and wherein said at least one discontinuous phase element is selected such that thermal lensing in said gain medium is reduced.

27. The method of claim 23, and wherein said laser resonator also comprises a non-linear crystal, and wherein said at least one discontinuous phase element is selected and disposed such that the intensity of said resonator mode in said non-linear crystal is generally higher than its intensity in said gain medium.

28. An optical resonator according to claim 1 wherein said at least one discontinuous phase element is disposed such that said at least one sharp discontinuity falls in a region of low intensity of a desired mode propagating in said resonator.

* * * * *